United States Patent
Predl

(10) Patent No.: US 10,273,664 B2
(45) Date of Patent: Apr. 30, 2019

(54) MANHOLE BASE LINER AND METHOD FOR MANUFACTURING A MANHOLE BASE LINER

(71) Applicant: Predl GmbH, Boenitz (DE)

(72) Inventor: Manfred Predl, Boenitz (DE)

(73) Assignee: Predl GmbH, Boenitz (DE)

( * ) Notice: Subject to any disclaimer, the term of this patent is extended or adjusted under 35 U.S.C. 154(b) by 0 days.

(21) Appl. No.: 15/801,604

(22) Filed: Nov. 2, 2017

(65) Prior Publication Data

US 2018/0282978 A1 Oct. 4, 2018

(30) Foreign Application Priority Data

Mar. 31, 2017 (AT) .............................. A 50257/2017

(51) Int. Cl.
*E03B 7/09* (2006.01)
*E03F 5/02* (2006.01)
*B28B 7/36* (2006.01)

(52) U.S. Cl.
CPC ............... *E03B 7/09* (2013.01); *B28B 7/364* (2013.01); *E03F 5/025* (2013.01); *E03F 5/027* (2013.01)

(58) Field of Classification Search
CPC .. E03B 7/09; B28B 7/364; E03F 5/025; E03F 5/027
See application file for complete search history.

(56) References Cited

U.S. PATENT DOCUMENTS

| | | | |
|---|---|---|---|
| 3,492,384 A | 1/1970 | Matthews et al. | |
| 3,562,969 A * | 2/1971 | Little, Jr. | ................ E02D 29/12 137/363 |
| 4,341,236 A * | 7/1982 | LaBenz | .................... E03F 5/02 137/363 |
| 4,346,921 A * | 8/1982 | Gill | ........................ E02D 29/12 285/110 |
| 4,444,221 A * | 4/1984 | LaBenz | .................... E03F 5/02 137/363 |
| 4,702,877 A | 10/1987 | Davis, Jr. | |
| 4,957,389 A * | 9/1990 | Neathery | ................ E02D 29/14 404/25 |
| 4,960,227 A * | 10/1990 | Coleman | .............. B65D 77/061 222/105 |
| 5,072,857 A * | 12/1991 | Coleman | .............. B65D 77/061 222/105 |
| 5,115,943 A * | 5/1992 | Coleman | .............. B65D 77/061 222/105 |

(Continued)

FOREIGN PATENT DOCUMENTS

| DE | 1584657 A1 | 6/1970 |
|---|---|---|
| DE | 3726752 A1 | 2/1989 |

(Continued)

OTHER PUBLICATIONS

Austrian Patent Office, Search Report in Austrian Patent Application A 50257/2017, dated Nov. 28, 2017.

*Primary Examiner* — Jeanette E Chapman
(74) *Attorney, Agent, or Firm* — Smartpat PLC

(57) ABSTRACT

A manhole base liner (1), in particular for a wastewater manhole, has a base body (2) which comprises a tread surface (3) and at least one pipe connection opening (5). The base body (2) is produced in one piece from flexible material with a wall thickness, with which it can be bent together substantially arbitrarily in at least partial regions.

8 Claims, 3 Drawing Sheets

(56) References Cited

U.S. PATENT DOCUMENTS

| | | | | |
|---|---|---|---|---|
| 5,816,293 | A * | 10/1998 | Kiest, Jr. | B29C 63/0095 |
| | | | | 138/98 |
| 5,879,501 | A * | 3/1999 | Livingston | B29C 63/346 |
| | | | | 156/242 |
| 7,601,390 | B1 | 10/2009 | Kinnaird et al. | |
| 7,793,991 | B2 * | 9/2010 | Wormall | E03F 5/02 |
| | | | | 137/372 |
| 8,636,036 | B2 * | 1/2014 | Kiest, Jr. | F16L 55/179 |
| | | | | 138/97 |
| 8,701,469 | B2 * | 4/2014 | Ober | G01N 33/0031 |
| | | | | 73/61.41 |
| 9,617,722 | B2 * | 4/2017 | Skinner | E02D 29/125 |
| 10,053,850 | B2 * | 8/2018 | Skinner | E02D 29/125 |
| 2007/0001330 | A1 * | 1/2007 | Driver | B29C 63/36 |
| | | | | 264/36.17 |
| 2010/0071804 | A1 * | 3/2010 | Rowe | E02D 29/12 |
| | | | | 141/86 |
| 2012/0009020 | A1 | 1/2012 | Kiest, Jr. | |
| 2016/0214275 | A1 | 7/2016 | Müller | |

FOREIGN PATENT DOCUMENTS

| | | | |
|---|---|---|---|
| DE | 29716969 U1 | 11/1997 | |
| DE | 10129860 | 1/2005 | |
| DE | 102013108844 A1 | 2/2015 | |
| EP | 174197 A * | 3/1986 | E06C 9/04 |
| EP | 1880829 B1 | 7/2009 | |
| FR | 2557899 A3 * | 7/1985 | E03F 5/02 |
| WO | WO-9118151 A1 * | 11/1991 | E03F 5/02 |
| WO | 2014167135 A1 | 10/2014 | |

\* cited by examiner

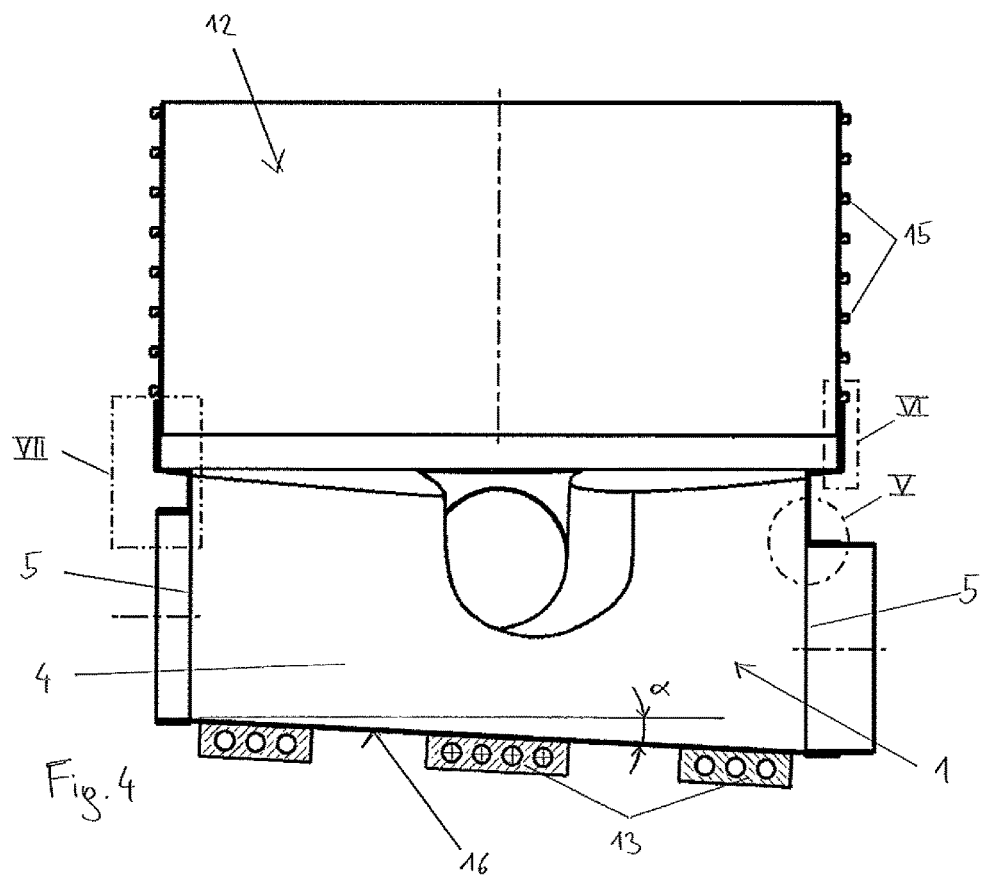
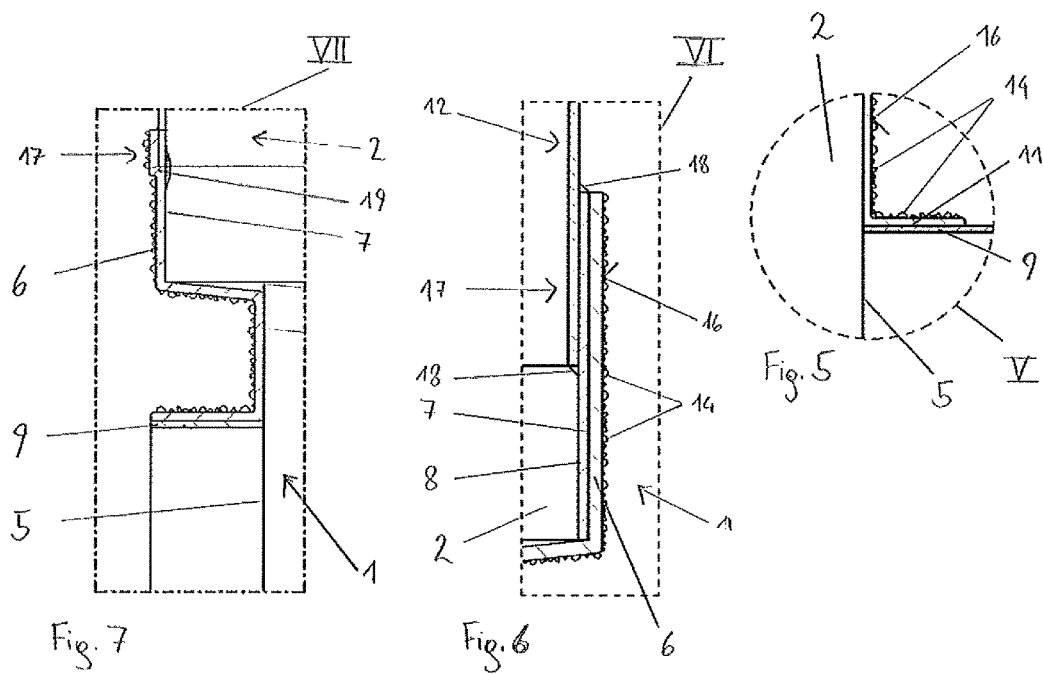

MANHOLE BASE LINER AND METHOD FOR MANUFACTURING A MANHOLE BASE LINER

TECHNICAL FIELD

The invention relates to a manhole base liner, in particular for a wastewater manhole, having a base body which has a tread surface and at least one pipe connection opening.

Furthermore, the invention relates to a method for the production of a formed part, in particular of a manhole base liner, and to a method for lining a manhole, in particular a wastewater manhole.

BACKGROUND

Man-size manholes of older construction, which are made of brick, concrete or concrete formed pieces, show signs of corrosion or wear after a certain time due to environmental influences. In particular, access shafts for wastewater networks, on the bases of which channels are formed, which form connections between wastewater pipes running into the manholes, are additionally subjected to severe loads by wastewater which can contain aggressive substances.

The surface of the material from which the manhole is built is attacked by corrosion. Different restoration methods are used in order to repair these manholes which are stressed by corrosion. In addition to coating the existing building fabric with different materials, restoration by inserting prefabricated components in manhole bases and in rising manhole components, i.e. in components forming wall areas, are state of the art.

In order to be able to carry out renovation work on site on the manhole base as effectively as possible, a prefabricated manhole base liner made of plastic, adapted to the manhole base to be renovated, is introduced into the manhole, arranged at the base of the manhole, if necessary, connected with pipes opening into the manhole and backfilled with concrete. If necessary, the inner surface of the wall of the manhole is also lined with a prefabricated manhole wall liner, which may also be fixed to the wall and, for example, be filled with concrete.

Since the entrance to the manhole has a considerably smaller clear width in the case of many wastewater manholes than the base of the manhole on which the manhole base liner made of plastic is arranged, either first the upper part of the manhole has to be removed or replaced when using prefabricated renovation components with currently existing renovation methods, or the manhole base liner made of plastic is divided into sections, which are joined together again in the manhole. Since both methods are very time-consuming and labor-intensive, this also has a negative effect on the costs and duration of the renovation. In addition, removal of the upper manhole components (cone) is not always possible.

A manhole base liner which consists of folding parts connected to one another by means of hinges, is known from DE 101 29 860 A1. However, these hinges are, on the one hand, difficult to manufacture and, on the other hand, form weak points, both as regards the mechanical strength as well as the tightness of the manhole base liner, and require reworking of the seams.

In the case of known production methods for manhole base liners made of plastic for renovation, a negative form made of plastic is produced on the basis of the manhole geometry of the manhole to be renovated, to which the material from which the manhole base liner is produced is then molded.

In known methods for the production of concrete manhole base sections for the new construction of manholes, negative forms of foamed plastic are milled or cut out according to the required manhole geometry, which are used for shaping the channel geometry in the concreting process. Since the surface of such a negative form of foamed plastic is very porous and rough, the surface must be sealed or coated before applying the material from which the manhole base liner is formed. This ensures that the negative form can be removed from the finished manhole lower part without destruction and that the manhole lower part has a surface that is as smooth as possible. A disadvantage of this is that the sealing or coating of the negative form entails a not inconsiderable expenditure of time and costs.

The invention is therefore based on the object of providing a manhole base liner, a method for producing a formed part, in particular a manhole base liner for a wastewater manhole, and a method for lining a manhole, in particular a wastewater manhole, of the type mentioned at the outset of the prior art which does not have the disadvantages of the prior art. On the one hand, the production process for a manhole base liner or for a formed part, for example, a concrete manhole base section, is to be simplified and, on the other hand, the work required in a manhole restoration is to be reduced.

SUMMARY

According to the invention, this object is achieved by a manhole base liner, in particular for a wastewater manhole, having a base body which has a tread surface and at least one pipe connection opening. The base body is manufactured in one piece from flexible material with a wall thickness, with which it can be bent together at least in partial regions essentially arbitrarily.

Furthermore, this object is achieved by a method for the production of a formed part, in particular of a manhole base liner for a wastewater manhole, having a base body which preferably has a tread surface and at least one pipe connection opening. The formed part according to the method is produced by a) creating a negative form of the formed part, b) at least regionally wrapping the negative form with a flexible film, in particular made of silicone or another elastic material, and c) creating the base body by molding a material in a liquid or pasty state on the negative form.

The object may further be achieved by a method for lining a manhole, in particular a wastewater manhole. The manhole has an inner wall, a base and an entrance opening. At least one pipe opens into the manhole. The method includes the following steps:

i. Manufacturing a manhole base liner having a base body which is produced in one piece from a flexible material and with a wall thickness, with which it can be bent together essentially arbitrarily at least in some partial regions, ii. introducing the manhole base liner having the bent-together base body through the entrance opening, and arranging the bent-apart manhole base liner at the base of the manhole, iii. fastening the manhole base liner at the base of the manhole, and iv. backfilling the manhole base liner with hardening filling material, in particular with concrete.

Preferred and advantageous embodiments of the invention are the subject matter of the dependent claims.

According to the invention, it is provided that the base body is produced in one piece from flexible material with a wall thickness, with which it can be bent together at least in partial regions essentially arbitrarily.

Arbitrarily bent in the context of the invention means that considerable regions of the base body can be bent, but that naturally, owing to the three-dimensional shape of the base body, some areas can be bent more easily than other areas. By selecting the wall thickness in individual areas, this bendability can also be influenced if necessary.

In the context of the invention, "bending" also means, in contrast to "kinking" or "folding", that the base body can be brought into a bent shape in regions. The base body is not plastically deformed along defined edges, bending regions or joints but can be elastically bent along regions which are not exactly defined.

In a particularly preferred embodiment, a channel which is sunken therefrom is arranged on the tread surface. At least one pipe connection opening preferably connects to this channel. In particular, the channel connects all pipe connection openings which the base body has. Since, as a rule, one of the pipe connection openings is provided as an outlet, the channel preferably has a slope with a slope angle towards this pipe connection opening. The channel may have a plurality of conduits, particularly interconnected with each other.

It is particularly advantageous when the base body has a connecting edge which protrudes essentially perpendicularly from the tread surface. The connecting edge preferably runs along the outer circumference of the tread surface or is adapted to an outer shape of the tread surface.

In an advantageous embodiment, the connecting edge is up to 15 cm high, but can also be designed to be higher in the context of the invention.

In a preferred embodiment, a transition strip is arranged along an edge inner side of the connecting edge, wherein the transition strip preferably is of the same height as the connecting edge and is connected thereto. The transition strip preferably consists of a thermoplastic material textile-coated at least on one side, but can also consist of the same material as the manhole base liner and in this case does not have to be textile-coated. The textile fibers are preferably arranged on a surface of the transition strip facing the connecting edge or the edge inner side.

In a further preferred embodiment, the connecting edge has no transition strip, but an offset step on the edge inner side so that an inner diameter of the connecting edge in the region of the tread surface is smaller than an inner diameter of an area of the connecting edge spaced upwardly therefrom.

Within the scope of the invention, it can be provided that a pipe socket is arranged on at least one pipe connection opening, if appropriate, on or in a tubular connecting piece formed on the base body. The pipe socket is preferably connected to a textile-coated, thermoplastic transition strip, preferably welded, which is arranged on the base body or in the connecting piece and is connected thereto. As an alternative or in addition, the pipe socket can be glued directly to the base body or the connecting piece, be laminated thereon, or otherwise connected.

An embodiment in which one or more bonding bridge(s) is/are arranged on the base body, in particular connected to the base body, is preferred. For the purposes of the invention, bonding bridges are both geometrically defined elements such as, for example, strips, as well as elements with an undefined geometric shape, such as, for example, granules. It is particularly advantageous when granules are arranged on an entire outwardly directed surface of the base body and, in addition, geometrically defined bonding bridges are arranged at certain points. The bonding bridges serve to anchor the manhole base liner in the material introduced or molded thereon and prevent the manhole base liner from lifting off the underlying material, for example, by the ground water pressure.

The bonding bridges are arranged on the base body during and/or after the production of the manhole base liner and preferably consist of a rigid or stiff material. They are in particular embedded in the liquid or pasty material of the base body or coated therewith, so that they are connected to the at least partially solidified material of the base body. It is equally conceivable to glue, laminate or connect in another manner individual or several or differently shaped bonding bridges to the base body.

It is preferred when the base body is produced from a polymer which is elastic, in particular highly elastic or flexibly deformable, wherein other elastically deformable or flexible materials are also conceivable. Polyurea is particularly preferred as the polymer.

In order to have the necessary elasticity and flexibility in the context of the invention, the material of the base body preferably has a Shore A hardness of between 60 and 80, in particular between 65 and 75, particularly preferably between 68 and 72. Within the scope of the invention, it is conceivable that the material has a Shore A hardness which lies outside the specified ranges, wherein it is important for the material to bend sufficiently strongly at the wall thickness with which it is produced, without thereby to be plastically deformed.

Within the scope of the invention, it is particularly advantageous when, in the case of the manhole liner according to the invention, only possibly existing pipe sockets and/or bonding bridges with a geometrically defined shape and/or granular bonding bridges are designed rigid or bend-rigid, and the remainder of the manhole base liner is designed flexible and bendable.

The method according to the invention for the production of a formed part, in particular a manhole base liner for a wastewater manhole, can be described as follows by way of example, without limiting the scope of the invention:

In a first method step, a negative form of the formed part to be produced, in particular the manhole base liner, is created. It is particularly preferred when the negative form is produced at least partially from a plastic, in particular milled out or cut from foamed plastic, such as expanded polystyrene, in particular from a block of such material. It is also conceivable that at least a part of the negative form, which can be used for several different embodiments of formed parts, is produced from other materials, such as, for example, metal, in particular aluminum.

The dimensions of the negative form for a manhole base liner are aligned with the manhole in which the manhole base liner is used and can be determined according to known dimensions or on the basis of extra measurements taken at the manhole.

In a subsequent method step, the negative form is wrapped, at least in some areas, with a stretchable and flexible film. Such a film preferably consists of an elastic, in particular highly elastic, deformable plastic, for example of silicone, wherein the term film is not to be understood as a restriction in terms of thickness. The film can be designed of varying thickness, for example between 0.01 mm to 5 mm, in particular between 0.5 mm and 3 mm, as required or according to material of the film. By covering the negative form with the film, the surface of the negative form is protected or sealed and sufficiently smooth for a later molding of the formed part, in particular of the manhole base liner.

In a particularly preferred embodiment of the method step for wrapping the negative form, the completely produced negative form is placed in an open top wrapping device which is covered or closed with the film by sealing. Subsequently, the air is evacuated in the wrapping device, in particular in a region between the negative form and the film, and the film is suctioned by the negative pressure onto the negative form or pressed against the negative form by the ambient pressure.

In a preferred further development of this preferred embodiment of the method, an overpressure between the negative form and the film or in the wrapping device is generated before the negative pressure is generated in the region between the negative form and the film. As a result, the film is elastically deformed and bulges away from the wrapping device and the negative form placed therein. The negative form is simultaneously or subsequently brought into contact with the bulging film and, if appropriate, brought into contact with the film. This is preferably performed with a lifting mechanism provided in the wrapping device, which lifts the negative form in the direction towards the film. Only then is the negative pressure generated between the film and the negative form. As a result of this further development, the formation of wrinkles which could occur on the film during the wrapping of the negative form can be largely prevented.

It is particularly advantageous when a belt, a ring, a clamping device or the like is clamped circumferentially around the negative form, in particular around a base region of the negative form surrounded by the film, following the at least partial wrapping of the negative form with the film. Thus, the film is pushed or pressed against the negative form so tightly that the negative pressure between the film and the negative form is maintained by itself and no pressure compensation can take place between the region between the film and the negative form and the environment.

In a further method step, the base body of the formed part, in particular the manhole base liner, is created. For this purpose, material which is in a liquid or pasty state is molded onto the wrapped negative form, in particular sprayed, cast, spread on, laminated, spatulated or otherwise applied. The molding can be carried out manually and/or automatically with the aid of suitable tools, such as, for example, a spray gun. The molding may be carried out in a single step or in a plurality of successive steps, optionally with the combination of different methods mentioned above or other methods.

Preferably, the material used to form the base body is an elastically deformable polymer, a thermoset or elastomer. Particular preference is given to the use of polyurea, when the base body is produced in one piece with a wall thickness, with which it can be bent together essentially arbitrarily in at least partial regions. It is also conceivable that the material used is a hardening material, for example concrete, wherein a thin layer of a plastic or other material can also be applied to the wrapped negative form before applying the hardening material.

In the case of a manhole base liner for the renovation of a manhole, the material of which the base body is made is preferably flexible in the state in which the manhole base liner is introduced into the manhole to be renovated. Within the scope of the invention, it is possible for the material to harden further in the course of time after introduction into the manhole and thus lose its flexibility, which is not disadvantageous for the invention, however. It is essential that the material is so flexible at the time when the manhole base liner is introduced into the manhole that the base body can be bent together in order to make it easier to introduce it into the manhole through the entry opening.

Within the scope of the invention, it is understood that flexible means that the material is elastically deformable and bendable in the case of a constant wall thickness or in the case of different wall thicknesses with which the base body is produced, in particular that the material deforms extensively elastically without destruction and can be elastically bent around bending radii which are preferably of the order of magnitude of more than 1 or 2 cm, preferably greater than 3 or 4 cm.

Preferably, at least one pipe socket and/or at least one transition strip (for example of fiber-reinforced plastic, in particular of glass-fiber-reinforced unsaturated polyester resin, textile-laminated thermoplastic or similar materials or material combinations) is arranged, in particular applied, pushed or fastened, on the negative form during the production of the base body. After the material of the base body has at least partially solidified, the pipe socket is connected to the base body.

Alternatively, the base body and at least one pipe socket can also be produced by one and the same flexible material, or no pipe socket can be provided at all. The pipe socket(s) and/or transition strip(s) can be arranged on the base body after the manufacture of the base body, in particular connected thereto, preferably glued, laminated or welded.

Furthermore, it is preferred within the scope of the method according to the invention that granular bonding bridges and/or one or more bonding bridges with a geometrically defined shape, for example in the form of a strip, are already arranged on the base body during manufacture of the base body, in particular are connected to the base body. However, it is also conceivable within the scope of the invention to fasten the bonding bridge(s) to the base body only after the base body has been produced.

In a final method step, the base body is removed from the negative form after the material of the base body sufficiently solidifies. It is also conceivable that, after the material forming the base body is at least partially solidified, further hardening material, in particular concrete, is applied to this material, in particular on the side of the base body which faces away from the negative form. The base body and the further material connected to the base body are removed from the negative form after the further material is at least partly solidified or hardened.

The method according to the invention for lining a manhole, in particular for renovating a wastewater manhole, can be described by example as follows, without limiting the scope of the invention:

The interior surface of the manhole, i.e., the base, the wall and the entrance opening or the manhole, can be cleaned by region or in a large area before being lined and can be freed from loose material and, if necessary, ground or milled off. Pipes leading into the manhole can, if required, be closed or sealed, for example, by shut-off bladders. The shut-off bladders can at the same time serve to fix the pipe sockets of a manhole base liner used in the manhole.

In a first method step, a formed part, in particular a manhole base liner, is produced, which has a base body which is flexible and can be bent together essentially arbitrarily.

The manhole base liner has at least one pipe connection opening and, if a plurality of pipe connection openings are provided, preferably a channel running between the pipe connection openings.

The dimensions of the manhole base liner conform to the manhole in which the manhole base liner is used and can be determined according to known geometrical dimensions (for example, from an existing database) or based on extra measurements carried out on the manhole. The measurement can be carried out manually or automatically, for example using a 3D scanner.

In a further method step, the manhole base liner is bent together and introduced into the manhole through the entry opening. In the manhole, the manhole base liner is again bent apart or unfolded by its elasticity largely into its original shape and is then arranged at the base of the manhole.

In a subsequent method step, the manhole base liner is fixed or fastened to the base of the manhole and is backfilled or filled in a further method step with a hardening filling material, such as concrete, so that the cavities between the manhole base liner and the base of the manhole (and possibly a lower edge area) are filled in.

In the context of the invention, the fixing or fastening of the manhole base liner serves to prevent the flexible manhole base liner from being pushed away from the bottom of the manhole or assuming an undesirable shape during the backfilling.

It is particularly preferred within the scope of the invention when a negative form, which was used for the production of the manhole base liner or has been produced after the production of the manhole base liner in accordance with the shape of the manhole base liner, is cut if necessary, is introduced into the manhole and is arranged suitably on the manhole base liner. By pinning down of this (if necessary reassembled) negative form, the manhole base liner is held in position and in shape during the backfilling and can neither be pushed up nor assume a shape other than the desired shape.

In a preferred implementation, a manhole wall liner is subsequently introduced into the manhole. This is preferably designed so large that the wall of the manhole can thus be covered essentially along the entire inner circumference of the manhole up to a fixed height, preferably over the entire height of the manhole.

It is advantageous if the manhole wall liner is partially accommodated with a lower region partly in a connecting edge protruding perpendicularly from the base body of the manhole base liner so that the connecting edge and the lower region of the manhole wall liner at least overlap in sections. The manhole base liner and the manhole wall liner are preferably connected to each other, in particular in the region of the connecting edge, for example welded, glued, laminated to one another or connected to each other by the use of a repair collar.

In a particularly advantageous implementation, the manhole wall liner is thermally connected, in particular welded, with a transition strip of textile-laminated thermoplastic, which is arranged on an inner side of the connecting edge and is connected to the base body.

Preferably, the manhole wall liner is then also back filled with a filling material, for example concrete.

At some time after the arrangement of the manhole base liner at the base of the manhole, the pipe connection openings or pipe sockets of the manhole base liner are tightly connected, in particular glued, laminated or welded, to the pipes which lead into the manhole or lead away from the manhole.

A hardening, mineral material, such as, for example, concrete, is preferably used as filling material for backfilling the manhole base liner and/or the manhole wall liner. If bonding bridges are arranged on the manhole base liner and/or on the manhole wall liner, these are anchored in the filling material during the hardening of the filling material.

BRIEF DESCRIPTION OF THE DRAWINGS

Further details, features and advantages of the invention will become apparent from the following description of preferred and non-limiting embodiments of the invention with reference to the accompanying drawings. They show:

FIG. 4 is a section along the plane IV through the manhole base liner of FIG. 3, FIG. 5 is a detailed view of a detail V from FIG. 4, FIG. 6 is a further detailed view of a detail VI from FIG. 4, FIG. 7 is a further detailed view of a detail VII from FIG. 4.

DETAILED DESCRIPTION

Figure 1:
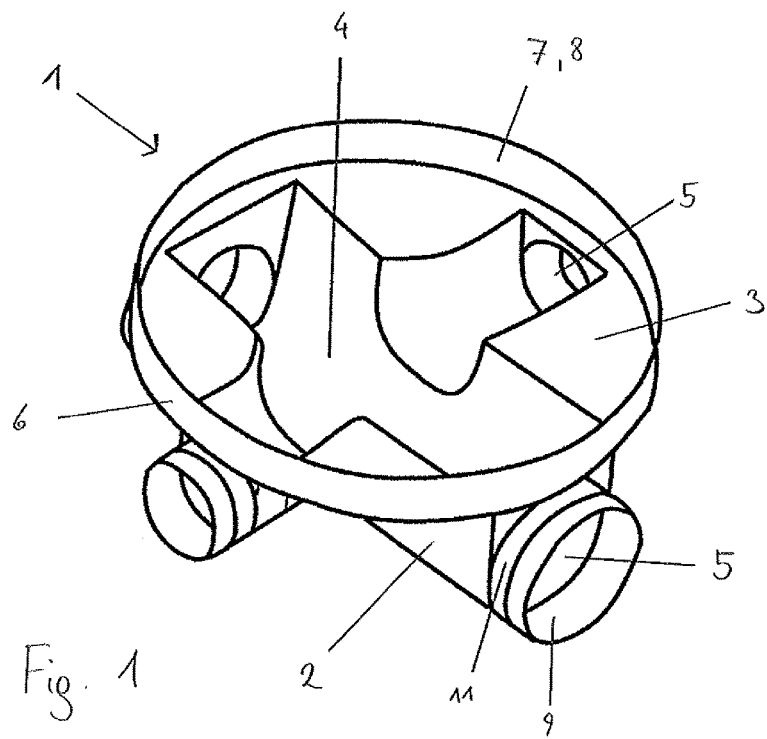
FIG. 1 is an isometric view of an embodiment of a manhole base liner according to the invention.

FIG. 1 shows a manhole base liner 1 according to the invention having a base body 2 which has a tread surface 3 with a channel 4 sunken therefrom, wherein the tread surface 3 is essentially circular in the embodiment shown in FIG. 1, but other forms (for example, polygons) are also conceivable within the scope of the invention. The channel 4 connects pipe connection openings 5, which are arranged below the tread surface 3.

The base body 2 is made of a flexible material and is produced in a wall thickness which allows it to be essentially arbitrarily bent together along any contours at least in the areas in which it does not have an increased deformation resistance due to its spatial shape.

At the edge of the tread surface 3, a connecting edge 6 is arranged which, preferably substantially perpendicularly, projects upwards away from the tread surface 3 and runs along an outer contour of the tread surface 3. The connecting edge is preferably but not necessarily made in one piece with the base body 2 and has an edge inner side 7 which is essentially completely covered by a transition strip 8.

A pipe socket 9 is arranged in or at each pipe connection opening 5. In this case, each pipe socket 9 is partially accommodated in a tubular connecting piece 11 protruding from the respective pipe connection opening 5 and is connected tightly to the pipe connection opening 5 and the base body 2 by way of this.

The tubular connecting piece 11 has either already been made in one piece with the base body 2 and thus made of the same material as this, or is a transitional strip 8 made of a textile-coated thermoplastic material or of a glass fiber-reinforced plastic, which can be fixedly and tightly connected both to the material of the base body and the material of the pipe socket. Alternatively, the connecting piece 11 can be connected to such a transition strip 8, which is preferably arranged along an inner side of the connecting piece 11, in particular connected thereto.

Figure 2:
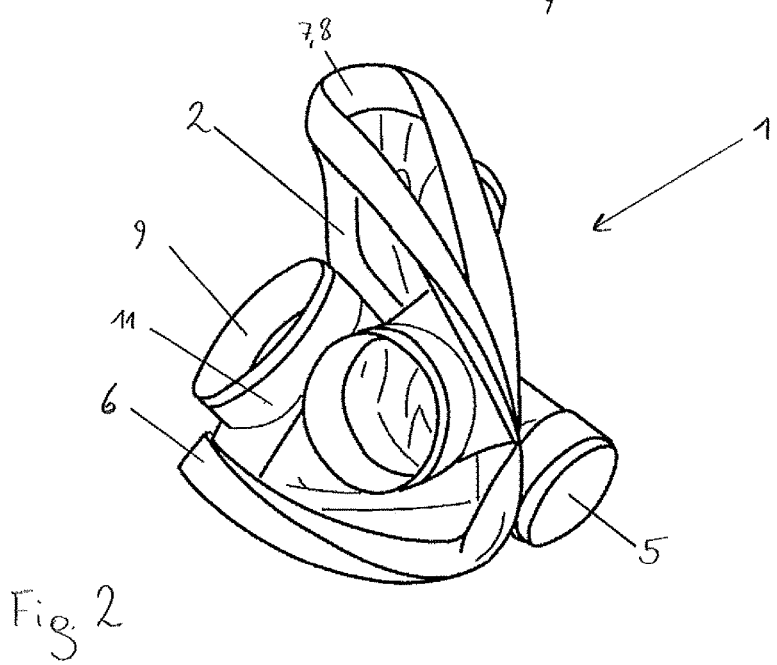
FIG. 2 is an isometric view of the bent together manhole base liner of FIG. 1.

FIG. 2 shows the manhole base liner illustrated in FIG. 1 in a bent-together shape, whereby the outer dimensions of the manhole base liner 1 can be substantially reduced in at least one direction. Thus, the manhole base liner 1 can in a bent-together shape be passed through an entry opening, in particular a manhole which is narrower at its widest point than the diameter of the tread surface 3.

Figure 3:
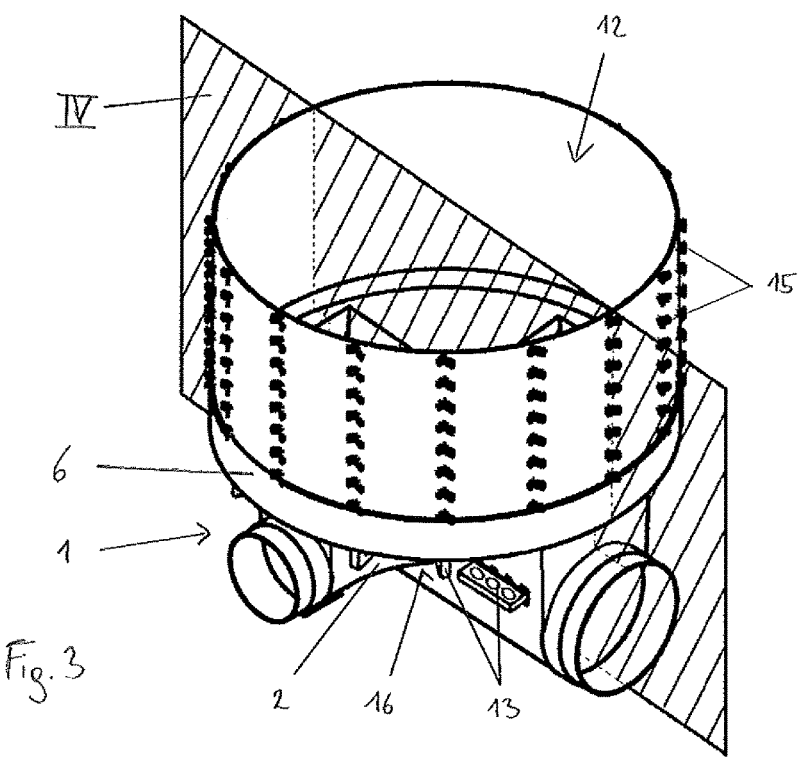
FIG. 3 is an isometric view of a further embodiment of a manhole base liner according to the invention, connected to a manhole wall liner.

FIG. 3 shows an isometric view of a manhole base liner 1 according to the invention, which is connected in the region of the connecting edge 6 to a manhole wall liner 12.

The manhole base liner shown in FIG. 3 has strip-shaped bonding bridges 13 which are arranged at suitable points on the underside of the base body 2. Furthermore, granulate-shaped bonding bridges 14 are attached to an outwardly facing surface 16 of the base body 2, in particular in the region of the underside or preferably in all regions of the base body 2 which are back filled with filler material. In the illustrated embodiment, the manhole wall liner 12 has further bonding bridges 15 arranged in the region of the outer side. The bonding bridges 13, 14 and 15 are used for the later anchoring of the manhole base liner 1 or of the manhole wall liner 12 in the backfilled material.

FIG. 4 shows a section along the plane IV through the manhole base liner 1 shown in FIG. 3 and the manhole wall liner 12 connected thereto. The channel 4 between the pipe connection openings 5 located in the sectional plane IV has a slope with a slope angle α, wherein other regions of the channel 4 can have either no slope or a slope with a same or different slope angle α.

FIG. 5 shows an enlarged detail V from FIG. 4 in the region of the pipe connection opening 5.

The tubular connecting piece 11 of the pipe connection opening 5 protruding from the base body 2 encloses the pipe socket 9 and is tightly connected thereto over the entire outer circumference of the pipe socket 9.

The detail VI from FIG. 4, which is shown enlarged in FIG. 6, is arranged in the region of the connecting edge 6.

A transition strip 8 is arranged on the edge inner surface 7 of the connecting edge 6 and covers the inner edge surface 7 of the connecting edge 6 substantially completely.

The transition strip 8 consists of a thermoplastic material with at least one textile-coated side, is molded onto the base body 2 during the production of the base body 2, and is firmly and tightly connected to the connecting edge 6 via the textile-coated side abutting against the edge inner surface 7.

The manhole wall liner 12 is at least partially in sections accommodated in the connecting edge 6 or transition strip 8 of the manhole base liner 1 so that an overlapping region 17 is formed between the manhole wall liner 12 and the transition strip 8 connected to the connecting edge 6.

The manhole wall liner 12, which consists of a thermoplastic material in the embodiment shown in FIG. 6, is connected to the transition strip 8, which is also made of a thermoplastic material, in particular welded to the transition strip 8 at the edge of the manhole wall liner 12, by means of a weld 18.

The detail VII of FIG. 4 shown in a larger detail in FIG. 7 is arranged in the region of the connecting edge 6 and the pipe connection opening 5.

In the embodiment shown in FIG. 7, the pipe socket 9 is substantially entirely accommodated in the associated pipe connection opening 5 and is tightly connected to the pipe connection opening 5 and the base body 2.

The manhole wall liner 12 is accommodated in the connecting edge 6 of the manhole base liner 1 and lines against a step 19 running in the connecting edge, wherein the overlapping region 17 between the connecting edge 6 and the manhole wall liner 12 form a kind of sleeve. An inner side of the manhole wall liner 12 essentially connects to the edge inner side 7 below the overlapping region 17 in a step-free or flush manner.

The manhole wall liner 12, which in the embodiment shown in FIG. 7 consists of a thermosetting material, is connected to the connecting edge 6, which is likewise made of a thermosetting material, in particular in which the manhole wall liner 12 is glued to the connecting edge 6 in the overlapping region, or in which a strip is laminated over the joint between the step 19 and the manhole base liner 12.

Figure 8:
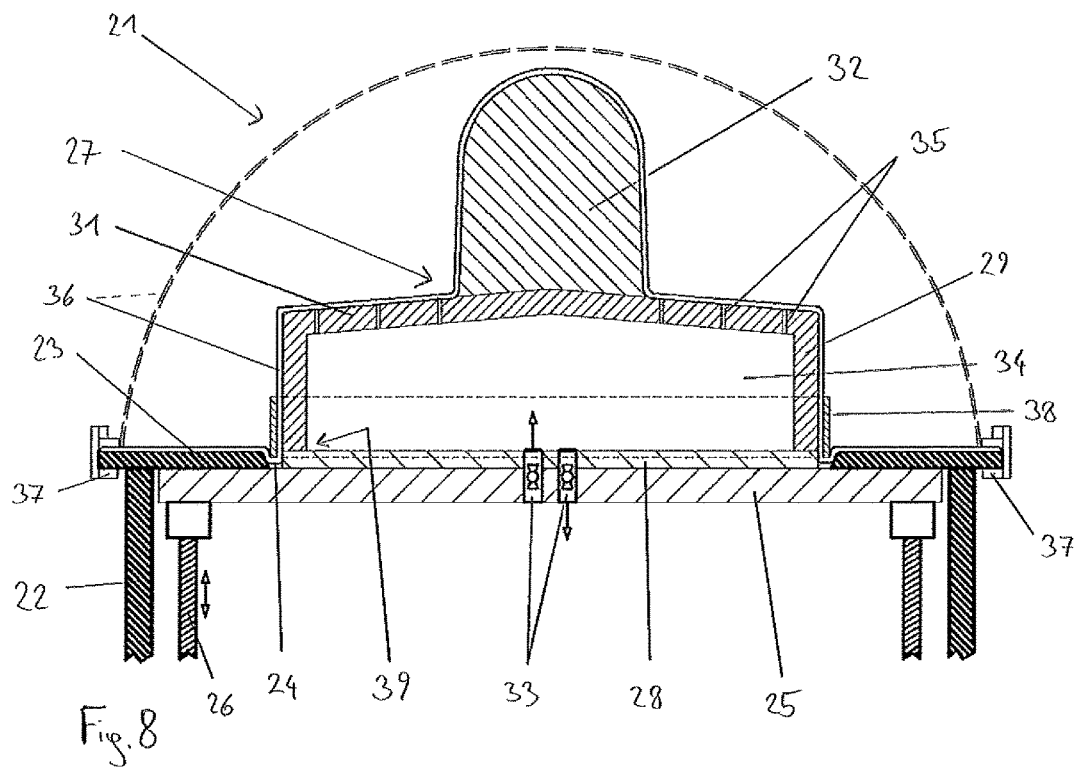
FIG. 8 is a section through a wrapping device, a negative form and a flexible film for use in a method according to the invention for the production of a formed part, in particular a manhole base liner according to the invention.

FIG. 8 shows a preferred embodiment of a wrapping device 21 for carrying out the method according to the invention for producing a formed part, in particular a manhole base liner 1 according to the invention.

The wrapping device 21 has a hollow cylindrical outer body 22, which is bounded upwards by a plate 23 with a central opening 24 and is preferably closed downwards.

In the outer body 22, a support table 25 is arranged parallel to the plate 23, which is adjustable by means of a lifting mechanism 26 between a lowered position, in which it is spaced from the plate 23 and the raised position shown, in which it rests against the plate 23 from below, in particular sealingly.

In a preferred implementation of the method according to the invention for producing a formed part in which the formed part is a manhole base liner 1 according to the invention, a negative form 27 of the manhole base liner 1 is arranged on the support table 25, wherein the support table 25 is in the lowered position.

The negative form 27 follows the shape of the finished manhole base liner 1 and further comprises a hollow cylindrical base body 29, which is arranged on a base plate 28 lying on the support table 25.

The base body 29 is closed at an end opposite the base plate 28 by a cover plate 31, which in the illustrated embodiment has the shape of a blunt conical tip facing away from the base plate 28. A channel shaped body 32 which projects upwards from the cover plate 31 has the internal shape of the channel 4 of the formed part, in particular the manhole base liner 1.

The base plate 28 closes the base body 29 from below and has a diameter which is smaller than the diameter of the opening 24. Valves 33, which are arranged on the support table 25 and on the base plate 28 or penetrate the support table 25 and the base plate 28, connect non-illustrated lines for fluid, in particular for air, to a cavity 34 formed in the base body 29.

Through holes 35 arranged in the cover plate 31 form a connection for the fluid between the cavity 34 and the space above the cover plate 31.

After the negative form 27 has been arranged on the support table 25, a flexible film 36 is arranged on top of the plate 23 so that the opening 24 is covered by the film 36.

The flexible film 36 is pressed tightly against the plate 23, which takes place in particular along an outer edge of the plate 23 and preferably with a clamping device 37 arranged there.

In a further method step, fluid, in particular air, is blown into the cavity 34 by one of the valves 33 so that an overpressure is formed between the negative form 27 and the flexible film 36, and the flexible film 36, as shown dotted in FIG. 8, is inflated. The flexible film 36 thereby protrudes upwards from the plate 23 in the form of a dome. Subsequently, or at the same time, the support table 25 is moved to the raised position shown in FIG. 8. Theoretically, the negative form 27 could also be lifted upwards in the context of the invention without the prior inflation of the film 36 and the film 36 can be thereby be tightened. However, this is less advantageous because the film 36 is thereby subjected to higher mechanical stress.

In this raised position of the support table 25, the fluid is suctioned off by the other valve 33, whereby a negative pressure is formed between the negative form 27 and the flexible film 36, and the flexible film 36 is pressed against the negative form 27 by the ambient pressure. Due to the previous pretension, the flexible film 36 is fitted against the negative form 27 without wrinkles and wraps it.

In the following method step, a belt 38 is arranged around the film 36 in the region of the plate 23, in particular being clamped around it. In this case, the belt 38 preferably also covers a base region 39 of the base body 29 and abuts the latter, wherein the film 36 is pressed externally against the base region 39 and the base plate 28, and a tight connection is formed between the base plate 28 and the base body 29.

After locking the valves 33 and releasing the clamping device 37, the negative form 27 can be removed from the wrapping device 21 of the support table 25 without the negative pressure within the negative form 27 being lost.

In the following method step, material can be molded onto the negative form 27 wrapped with the flexible film 36.

The negative form 27 or single or several parts of the negative form 27 can be detached at a later time from the formed part molded thereon and can thus be used for the production of further form parts. It is likewise possible to use the belt 38 and the flexible film 36 for producing further formed parts.

LIST OF REFERENCE NUMBERS

1 Manhole base liner
2 Base body
3 Tread surface
4 Channel
5 Pipe connection opening
6 Connecting edge
7 Edge inner side
8 Transition strips
9 Pipe socket
10 - - -
11 Connecting piece
12 Manhole wall liner
13 Bonding bridge with geometrically defined shape
14 Granulated bonding bridges
15 Other bonding bridges
16 Surface
17 Overlapping region
18 Weld
19 Step
20 - - -
21 Wrapping device
22 Outer body
23 Plate
24 Opening
25 Support table
26 Lifting mechanism
27 Negative form
28 Baseplate
29 Base body
30 - - -
31 Cover plate
32 Channel-shaped body
33 Valves
34 Cavity
35 Through holes
36 Flexible film
37 Clamping device
38 Belt
39 Base region
α Slope angle
IV Sectional plane
V Detail
VI Detail
VII Detail

What is claimed is:

1. A manhole base liner having a base body which has a tread surface and at least one pipe connection opening,
    wherein the base body is manufactured in one piece from flexible material with a wall thickness, with which it can be bent together at least in partial regions essentially arbitrarily, and
    wherein granulate-shaped bonding bridges and/or bonding bridges with geometrically defined shape are arranged on an outwardly directed surface of the base body.

2. The manhole base liner as in claim 1, wherein a channel, which is sunken from the tread surface, is arranged on the tread surface, and wherein at least one pipe connection opening connects to the channel.

3. The manhole base liner as in claim 1, wherein the tread surface has a connecting edge which projects essentially perpendicularly and which is adapted to an outer shape of the tread surface.

4. The manhole base liner as in claim 3, characterized in that a transition strip is arranged along an edge inner side of the connecting edge.

5. The manhole base liner as in one of claim 1, wherein a pipe socket is arranged at the pipe connection opening.

6. The manhole base liner as in claim 5, wherein the pipe socket is connected directly to the pipe connection opening and/or to a connection piece, or is connected to a textile-coated, thermoplastic transition strip arranged in the pipe connection opening and/or in the connecting piece.

7. The manhole base liner as in claim 1, wherein the base body consists of a polymer.

8. The manhole base liner as in claim 1, wherein the base body is made of polyurea.

* * * * *